US006222498B1

(12) United States Patent
Ishii et al.

(10) Patent No.: US 6,222,498 B1
(45) Date of Patent: Apr. 24, 2001

(54) CDMA MULTIUSER RECEIVER FEATURING A COMBINATION OF ARRAY ANTENNA AND MULTIUSER CANCELERS

(75) Inventors: Naoto Ishii; Yasushi Maruta; Shousei Yoshida; Akihisa Ushirokawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/227,705

(22) Filed: Jan. 8, 1999

(30) Foreign Application Priority Data

Jan. 8, 1998 (JP) .................................................. 10-013196

(51) Int. Cl.[7] .................................................. H04B 1/707
(52) U.S. Cl. .......................... 343/853; 370/342; 375/349
(58) Field of Search ........................... 342/354; 375/349, 375/206; 455/12.1, 13.1, 506; 701/213; 370/342, 491

(56) References Cited

U.S. PATENT DOCUMENTS 5,905,721 * 9/1996 Liu et al. .............................. 370/342

FOREIGN PATENT DOCUMENTS

| 1-206745 | 8/1989 | (JP) . |
| 7-131382 | 5/1995 | (JP) . |
| 7-303092 | 11/1995 | (JP) . |
| 9-270736 | 10/1997 | (JP) . |
| 9-270766 | 10/1997 | (JP) . |
| 63-240226 | 10/1998 | (JP) . |

OTHER PUBLICATIONS

M.K. Varanasi, et al., "Multistage Detection in Asynchronous Code–Division Multiple–Access Communications", *IEEE Transactions on Communications*, vol. 38, No. 4, Apr. 1990, pp. 509–519.

M. Sawahashi, et al., "Serial Canceler Using Recursive Channel Estimation by Pilot Symbols for DS–CDMA", *Electronics Information Communications Association of Japan*, Technical Report RCS95–50, Jul. 1995.

Yoshida, et al., "CDMA Multi–Stage Interference Canceler with Recursive Channel Estimation Based on Symbol Replica Processing", the Institute of Electronics, Information and Communication Engineers, *Technical Report of IEICE*, A., pp. 96–157, EMCJ 96–92, RCS 96–171, Feb. 1997 (Prior Paper 3).

R. Kohno, et al., "Combination of an Adaptive Array Antenna and a Canceler of Interference for Direct–Sequence Spread–Spectrum Multiple–Access System", *IEEE Journal*, vol. 8, N. 4, May 1990, pp. 675–682 (Prior Paper 4).

R.O. Schmidt, et al., "Multiple Emitter Location and Signal Parameter Estimation", IEEE Trans., vol. AP–34, No. 3, pp. 276–286, Mar. 1986.

R. Roy, et al., "ESPRIT–Estimation of Signal Parameters via Rotational Invariance Techniques", *IEEE Trans.*, vol. ASSP–37, pp. 984–995, Jul. 1989.

\* cited by examiner

*Primary Examiner*—Don Wong
*Assistant Examiner*—James Clinger
(74) *Attorney, Agent, or Firm*—Scully, Scott, Murphy & Presser

(57) ABSTRACT

In order to effectively reduce a size of CDMA multiuser receiver while maintaining an excellent interference cancellation, an array antenna is combined with a multiuser receiver. The multiuser receiver includes signal processing means which is supplied with incoming signals received at the array antenna. The signal processing means estimates interfering signals with respecting to each of the antenna elements and with respect to each of simultaneously accessing users.

4 Claims, 15 Drawing Sheets

CDMA MULTIUSER RECEIVER FEATURING A COMBINATION OF ARRAY ANTENNA AND MULTIUSER CANCELERS

BACKGROUND OF THE INVENTION

1. Field of the Invention

The present invention relates to a CDMA (code-division multiple-access) multiuser receiver which combines directivity control of an array antenna and interference canceling operations. The CDMA multiuser receiver according to the present invention features a small size and excellent interference cancellation. By way of example, the present invention may be applicable to the receiver installed in the base station of a cellular mobile communications system.

2. Description of the Related Art

It is expected that CDMA is able to markedly increase a subscriber's capacity and thus find an extensive application in a cellular mobile communications system (for example). However, the mobile communications utilizing CDMA (viz., spread-spectrum) techniques have suffered, at a receiver side, the problems of interference caused by delayed signals due to multiple transmission paths and concurrently communicating other party's signals.

As is known in the art, an array antenna is able to suppress and cancel interference through directivity control. On the other hand, a multiuser receiver is a receiver which demodulates all the user's signals by implementing mutual interference cancellation using all the user's spreading codes and channel characteristics. The multiuser receiver itself is known in the art. One example of such a receiver is disclosed in a paper by M. K. Varanasi and B. Aazhang, entitled "Multistage Detection in Asynchronous Code-Division Multiple-Access Communications", IEEE Transactions on Communications, Vol. 38, No. 4, April 1990, pp. 509–519 (Prior Paper 1). Another example of a conventional multiuser receiver is disclosed in a paper by M. Sawahashi, et al., entitled "Serial Canceler Using Recursive Channel Estimation by Pilot Symbols for DS-CDMA", Electronics Information Communications Association of Japan, Technical Report RCS95-50, July 1995 (Prior Paper 2).

According to the apparatus disclosed in the aforesaid Prior Paper 1, all the user's signals are demodulated at an initial stage of the apparatus, after which an interfering replica of each user becomes produced. Subsequently, interference cancellation is implemented by reducing an interference replica of each of the users other than a desired user from a received signal. At the next stage, the signal, which has been obtained through the interference cancellation, is again demodulated in connection with the desired (intended) user and therefore, the signal quality of the demodulation result at the second stage is higher than that at the first stage. Thus, the conventional technique, disclosed in Prior Paper 1, is to improve the interference cancellation by repeating a series of signal processes using multi-stage configuration.

Channel estimation is necessary to demodulate the signal of each user and produce an interference replica. The aforesaid Prior Paper 2 discloses that a channel (viz., transmission path) is recursively estimated at each stage thereby to prevent deterioration of the interference cancellation characteristics due to channel estimation error.

Another example of the multiuser receiver is disclosed in a paper by Yoshida and Ushirokawa, entitled "CDMA Multi-Stage Interference Canceler with Recursive Channel Estimation Based on Symbol Replica Processing", the Institute of Electronics, Information and Communication Engineers, Technical Report of IEICE, A. p96–157, EMCJ96-92, RCS96-171, February 1997 (Prior Paper 3).

The above-mentioned Prior Paper 3 discloses a multi-stage type CDMA multiuser receiver. According to this known technique, the size of the apparatus can be reduced through the use of symbol replica processing. At the same time, it is possible to realize interference cancellation at the unit of multi-path in the case of implementing recursive channel estimation thereby to improve interference cancellation in the case of multi-path transmission.

FIG. 1 is a drawing showing a CDMA multiuser receiver that is based on the known techniques disclosed in Prior Paper 3. The CMDA multiuser receiver of FIG. 1 is comprised of three-stage interference cancelers 10-1 to 10-3. At the first two stages of interference cancelers 10-1 and 10-2, the signals of all the users, the number of which is assumed three, are demodulated and then subjected to interference cancellation. That is, this means that the multiuser interference cancellation is implemented.

As shown in FIG. 1, the interference canceler 10-1 at the first stage is provided with a delay unit 12, three EIUs (interference estimation units) 14a–14c, an adder 16, and another adders 18a–18c. The interference canceler 10-2 is configured in the same manner as the canceler 10-1 and is comprised of three IEUs (interference estimation units) 14a'–14c', an adder 16', and another adders 18a'–18c'.

On the other hand, the interference canceler 10-3 at the final stage is provided with IEUs 20a–20c each of which differs from those provided at the first and second stages.

A received signal is directly applied to the first stage (viz., interference canceler 10-1). The interference canceler 10-3 at the final stage is not provided with any delay unit and any adder. The IEUs 20a–20c generate demodulated signals respectively corresponding to the first to third users.

The operations of the interference cancelers 10-1 and 10-2, which are respectively provided at the first and second stages, are identical with each other and thus, there will be described the operation of the first stage. The three IEUs 14a–14c respectively output estimated interference spread signals that are applied to the adder 16. The delay unit 12 operates such as to delay the incoming signal by the time for which each of the IEUs 14a–14c estimates the interference and outputs the result thereof, and applies the output thereof to the adder 16 and the delay unit 12' of the second stage. The adder 16 subtracts the outputs of the IEUs 14a–14c from the output of the delay unit 12, and applies the output thereof to the adders 18a–18c that are respectively assigned to the users. Each of the adders 18a–18c sums the output of the adder 16 and the output of the corresponding IEU (14a, 14b, or 14c), and applies the resultant sum to the second stage.

The IEUs 14a–14c of the first stage and the IEUs 14'a–14c' of the second stage are substantially identical with each other in terms of configuration as well as operations, and accordingly there will be described only the IEU 14a of the first stage.

The IEU 14a of FIG. 2 is configured under the assumption that the number of paths of the incoming signal is three (3). In the drawing, the circuits prepared for first to third propagation paths are depicted by P1–P3. Since the circuits for the multiple paths are identical with each other, the description is made with reference to the circuit P1 for the first path. The IEU shown in the drawing is generally comprised of a front section (stage) S1, an intermediate section S2, and a rear section S3. More specifically, the front section S1 comprises a spread-spectrum despreader 22 and a detector 24, while the intermediate section S2 comprises an adder 25 and a discriminator 26. Finally, the rear section S3 comprises a multiplier 27, a spread-spectrum modulator 28 and an adder 29. Further, the detector 24 comprises a channel estimator 24a, a complex conjugate generator 24b, and a multiplier 24c.

The received signal (incoming signal) is split and applied to the circuits P1–P3 prepared for the three transmission paths. The despreader 22 despreads the incoming signal using the first user's spreading code at the timing in synchronism with the spreading code transmitted via the first path, and outputs the operation result.

The detector 24 is supplied with the output of the despreader 22, implementing channel estimation at the channel estimator 24a, applying the estimated channel characteristics to the multiplier 24c via the complex conjugate generator 24b, and implementing carrier phase coherent detection. The multiplier 24c implements amplitude weighting on the output of the despreader 22, using the output of the complex conjugate generator 24b, for the purpose of Rake combination at the subsequent block. The amplitude weighting is for implementing Rake combination (maximum ratio combination) on the output of the despreader 22.

It is deemed advantageous to operate the detector 24, in an environment of fading, using coherent detecting techniques which are disclosed in Prior Paper 2 and via which a carrier is estimated through the use of pilot symbols inserted on a time axis.

The adder 25 combines using Rake combination techniques, the weighted outputs of the multipliers 24c respectively provided in the circuits P1–P3 for the three paths. The combined signal is fed to the discriminator 26 that determines the most likely transmitted symbol.

The output of the discriminator 26 is again split and applied to circuits P1–P3 of the third section S3, which are respectively assigned to the thee transmission paths. The multiplier 27 multiplies the output of the discriminator 26 by the estimated channel characteristics, viz., the output of the channel estimator 24a. The spread-spectrum modulator 28 spreads the output of the multiplier 27 using the first user's spreading code at the timing which is in synchronism with the spreading code transmitted via the first path.

An adder 29 sums (synthesizes) the outputs of the circuits P1–P3 which are respectively assigned to the three paths and which are the replicas of respective paths. Thus, an interference replica of the first user is generated.

The interference canceler 10-3 shown in FIG. 1 is comprised of IEUs 20a–20c which are configured in a manner identical with each other, and accordingly, only the IEU 20a provided for the first user will be described.

Referring to FIG. 3, there is shown the IEU 20a in block diagram form. As shown in FIG. 3, the IEU 20a is configured in a manner exactly identical with those of the front and intermediate sections shown in FIG. 2. Therefore, the reference numerals already used for the blocks of FIG. 2 are attached to the counterparts of FIG. 3 and the description thereof will be omitted.

On the other hand, the techniques for canceling signal interference by applying an array antenna to a CDMA's single user receiver is disclosed in a paper by R. Kohno, H. Imai, M. Hatori and S. Pasupathy, entitled "Combination of an Adaptive Array Antenna and a Canceler of Interference for Direct-Sequence Spread-Spectrum Multiple-Access System", IEEE Journal on selected areas in communications, Vol. 8, N. 4, May 1990, pp. 675–682 (Prior Paper 4).

According to the apparatus disclosed in the aforesaid Prior Paper 4, the array antennas is controlled such as to be directed to an arrival angle of a desired signal and acquires the same, after which the interfering signal components within the directivity are despread. The apparatus demodulates the signal components and generates a temporal symbol, after which the apparatus again spreads the signal and generates interfering signal components. In other words, the apparatus carries out interference cancellation by subtracting the interfering signal components from the signal received by the array antenna, and then demodulates the desired (intended) user's signal. Although this conventional apparatus utilizes spreading codes and channel characteristics of all users, it is understood that the apparatus implements interference cancellation for a single user and thus is classified as a single user receiver.

FIG. 4 shows one example of the above-mentioned conventional receiver wherein an array antenna 30 is combined with an interference canceler. In order to simplify the description and the drawing, it is assumed that an array antenna consists of two antenna elements and the number of total users is three. The receiver is a single user CDMA receiver for demodulating one user (the third user in this particular case).

Superimposed data of desired and interfering signals are applied to two antenna elements 30a and 30b. The signal received at the antenna elements 30a and 30b are respectively weighted, at corresponding complex multipliers 32a and 32b, by antenna weighting coefficients W1 and W2 and thereafter added at an adder 34. The output of the adder 34 is applied to despreader 36a and 36b which are provided for the two users (viz., first and second users) other than the third user (whose signal is to be received in the instant case). Further, the output of the adder 34 is also applied to a delay unit 38. The outputs of the despreader 36a and 36b are respectively applied to discriminators 40a and 40b at which temporal symbol discrimination is implemented. The outputs of the discriminators 40a and 40b (viz., signals representative of temporal symbols) are respectively applied to spreader 42a and 42b which issues interfering signal components based on the discrimination results.

A delay unit 38 is used to delay the output of the adder 34, which is denoted by 34a and is to be applied to an adder 44. In more specific terms, the delay unit 38 is provided to delay the signal 34a (viz, the output of the adder 34) until a signal 34b, applied to the despreader 36a and 36b, is outputted from spreaders 42a and 42b.

The adder 44 subtracts the outputs of the spreaders 42a and 42b (viz., interfering signal components) from the output of the delay unit 38, and applies the result to a despreader 46 and a delay unit 48.

The output of the despreader 46 is applied to a discriminator 50 which demodulates the signal of the third user and outputs the demodulated signal to an external circuit (not shown). That is, the despreader 46 and the discriminator 50 are provided for the third user. On the other hand, the output of the discriminator 50 is also applied to a spreader 52 for the third user, via which a spread signal for the third user is obtained.

The delay unit 48 is to delay the output of the adder 44 (depicted by 44b) by a time period for which the output of the adder 44 (depicted by 44a) has been subjected to symbol discrimination and the spreader 52 generates the spread signal for the third user. The signal thus delayed is applied to the adder 54.

The adder 54 produces an error signal 56 by subtracting the output of the spreader 52 from the output of the delay unit 48. The error signal 56 is fed to an antenna weighting coefficient determiner (adaptively renewing means) 58. This determiner 58 controls the directivity of the array antenna 30 using the signals received at the antenna elements 30a and 30b along with known adaptive algorithm.

The receiver shown in FIG. 4 is an apparatus for use in producing the demodulated signal only for the third user. In other words, in order to demodulate the signals of the other users, viz., first and second users, it is necessary to provide the receivers respectively dedicated to the first and second users.

There has been so far no proposal of combining an array antenna and a CDMA multiuser receiver. By way of example, if an array antenna is simply applied to the multiuser receivers shown in FIGS. 1–3, particularly the interference estimating section becomes complex thereby to be unable to simplify the overall configuration of the receiver.

In addition, the single user receiver shown in FIG. 4, which features a combination of an array antenna and an interference canceler, suffers from the following problem when applied to the case of simultaneously processing a plurality of users. That is, in such a case, it is absolutely necessary to prepare a plurality of identical receivers that are arranged in parallel for respective users.

SUMMARY OF THE INVENTION

Accordingly, the object of the present is to provide a CDMA multiuser receiver which is able to demodulate a plurality of user's signals, without incurring increase in the arrangement or size, by combining an array antenna and a multiuser receiver.

Another object of the present invention is to provide a CDMA multiuser receiver which is based on an effective combination of an array antenna and an interference canceler and features the marked reduction of size of the apparatus with excellent interference cancellation.

In brief, these objects are achieved by techniques wherein in order to effectively reduce a size of a CDMA multiuser receiver while maintaining an excellent interference cancellation, an array antenna is combined with a multiuser receiver coupled to said array antenna. The multiuser receiver includes signal processing means which is supplied with incoming signals received at said array antenna. The signal processing means estimates interfering signals with respect to each of the antenna elements and with respect to each of simultaneously accessing users.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 5:
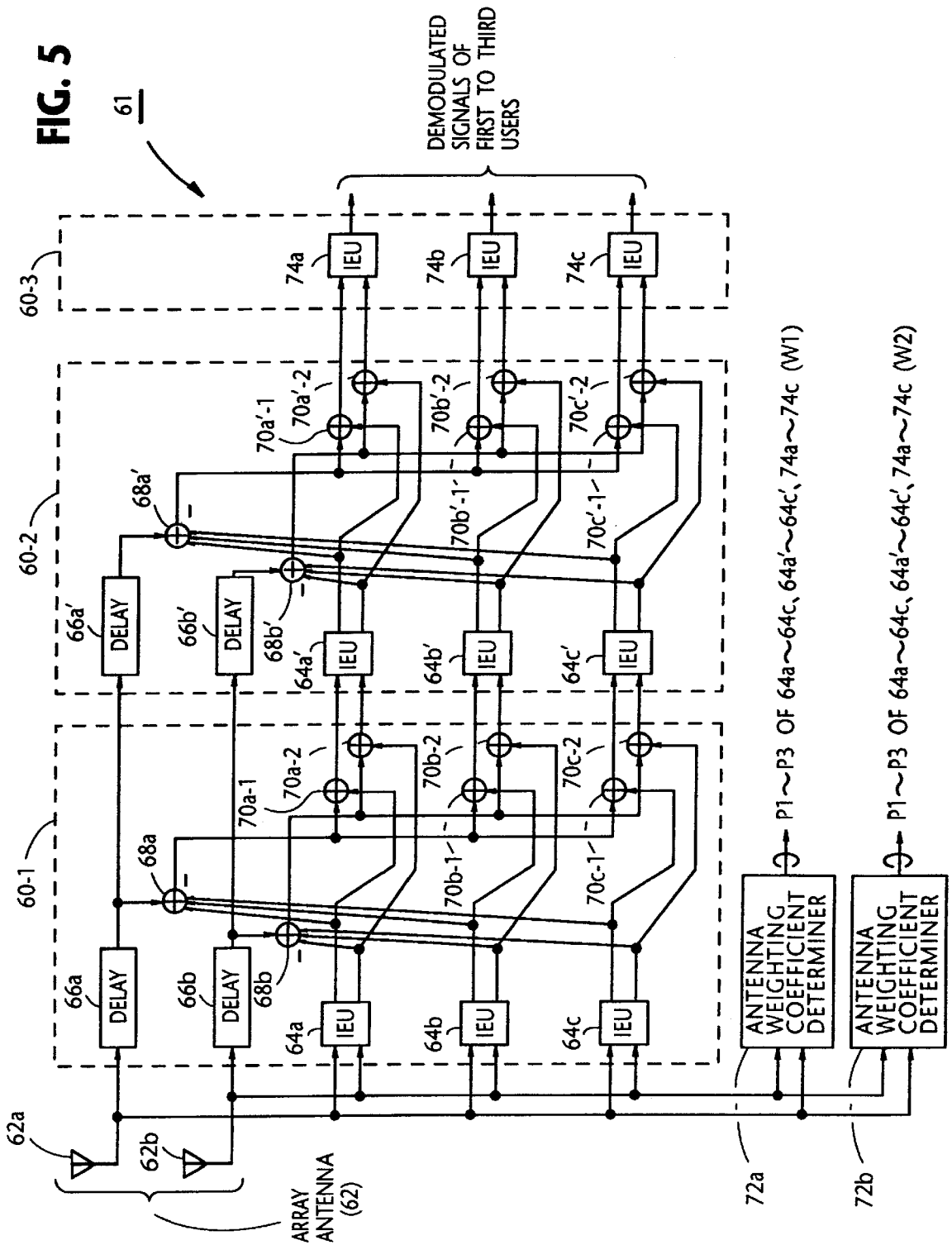
FIG. 5 is a diagram schematically showing CDMA receiver according to a first embodiment of the present invention.
Figure 6:
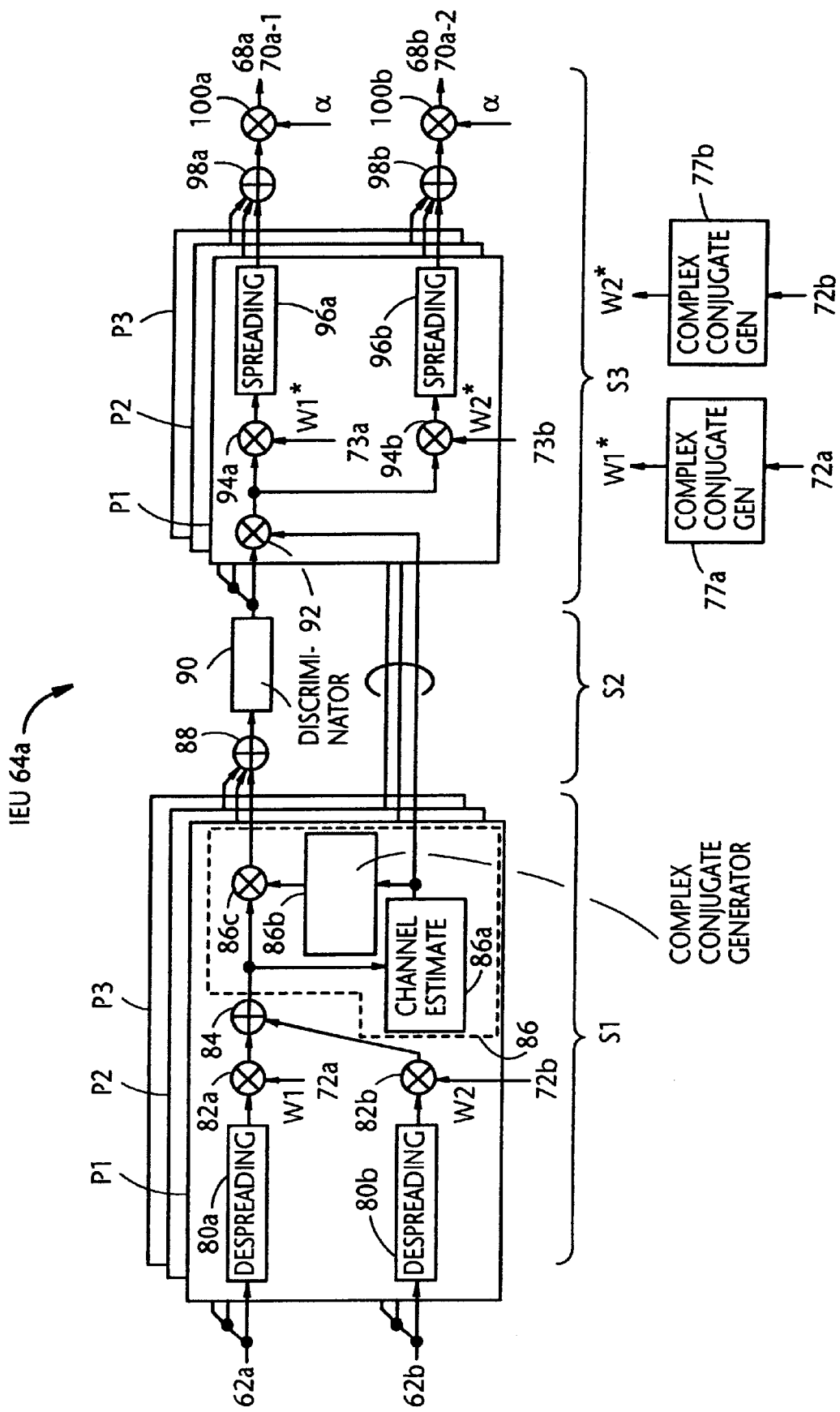
FIGS. 6 to 8 are each diagrams showing a detailed arrangement of a block of FIG. 5.
Figure 7:
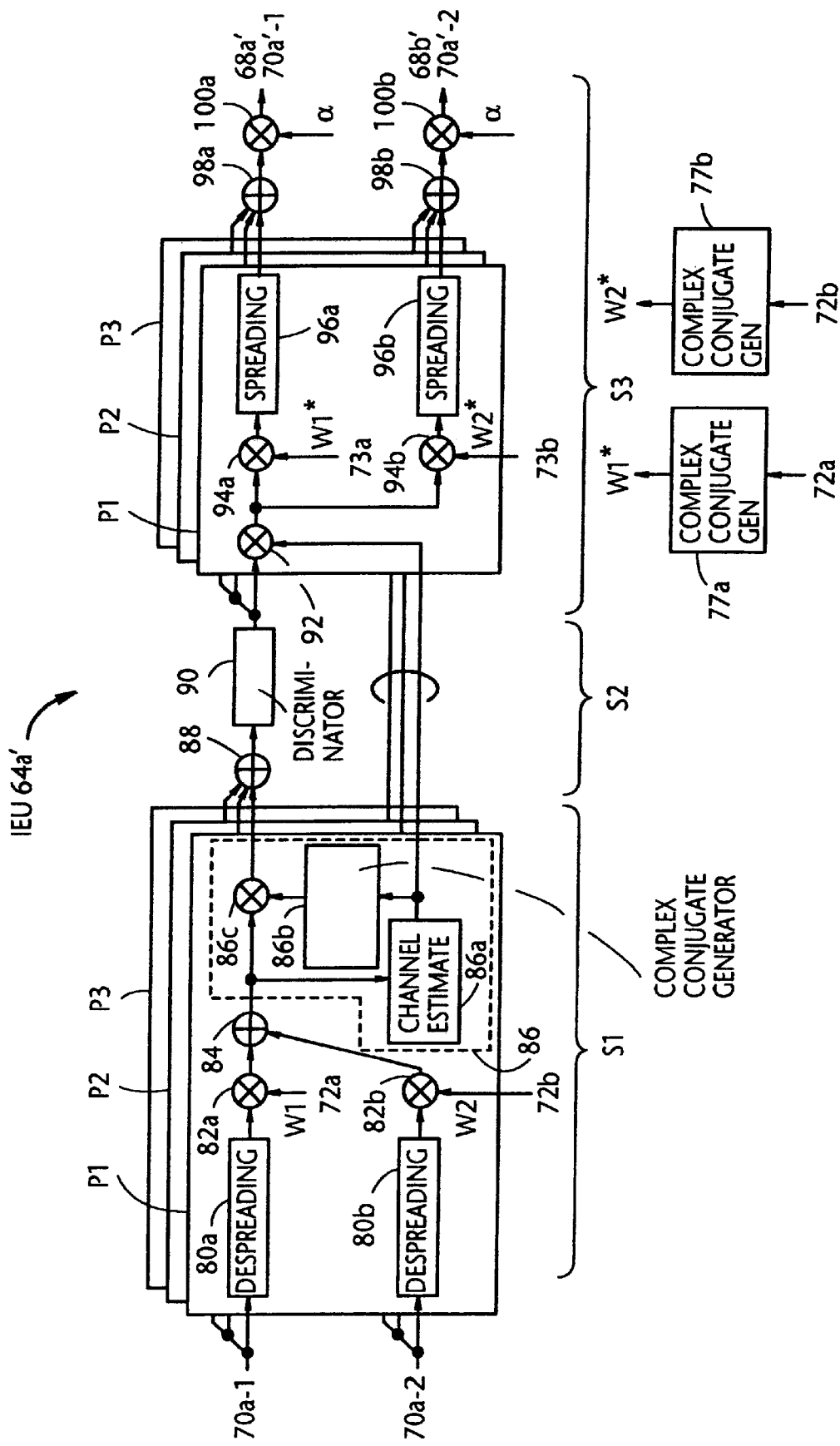
Figure 8:
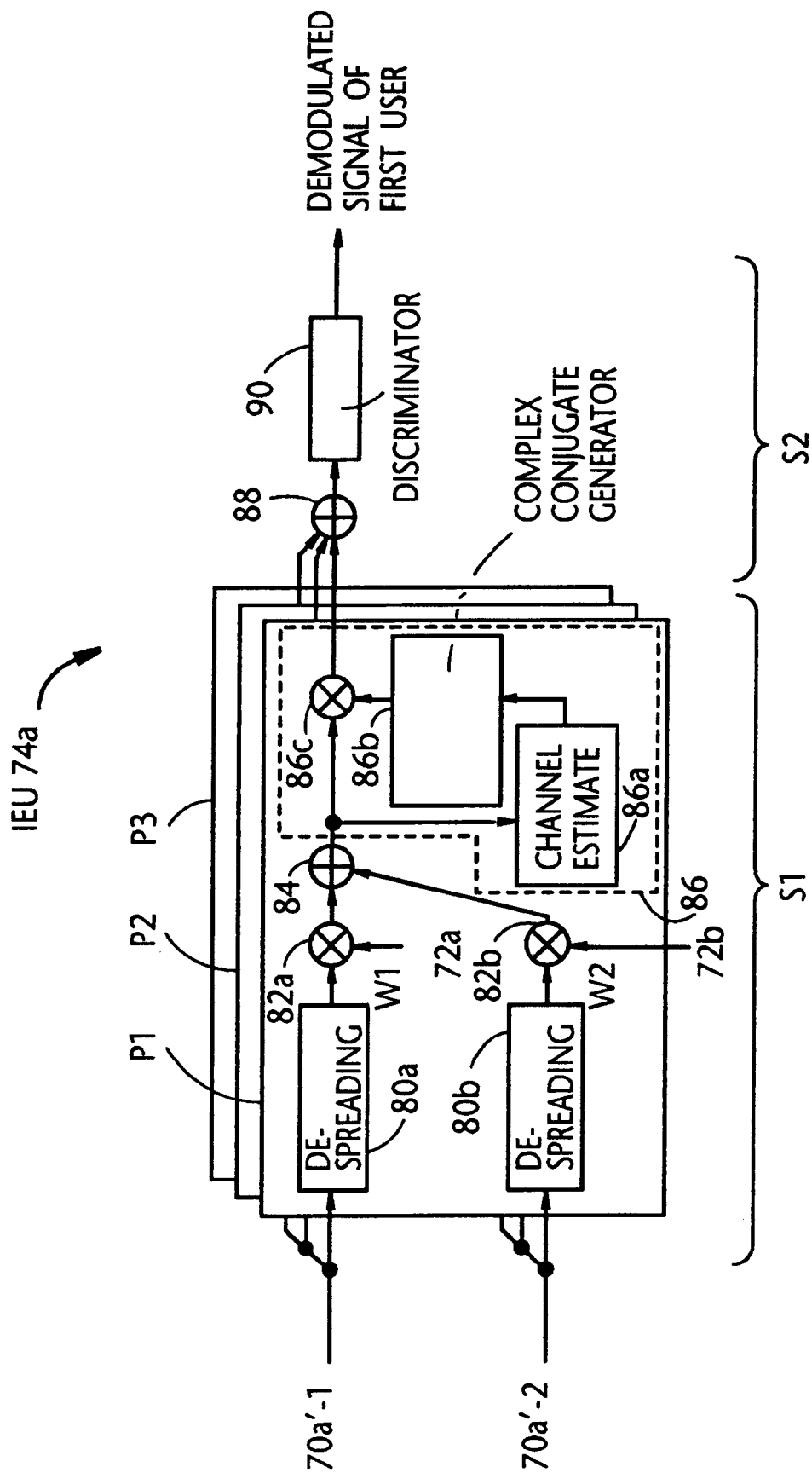

Referring now to FIG. 5, a CDMA multiuser receiver 61 according to a first embodiment of the present invention is schematically shown in block diagram form. FIGS. 6–8 illustrate detailed arrangements of IEUs 64a, 64a', and 74a of FIG. 5, respectively. Incoming signals are received at an array antenna 62 that comprises two antenna elements 62a and 62b in this particular embodiment. It is assumed that the number of multiple transmission paths is three, the number of stages for interference cancellation is three, and the number of simultaneously accessing users is three. It is to be noted that the aforesaid numbers of antenna elements, multiple transmission paths, etc. are exemplary and in no way limited thereto.

The receiver shown in FIG. 5 comprises three interference cancels 60-1 to 60-3, among which the interference cancelers 60-1 and 60-2 are configured in exactly the same manner except for the connection of the outputs of delay units.

As shown, the interference canceler 60-1 is comprised of three IEUs 64a to 64c which are respectively provided for first to third users, two delay units 66a and 66b whose number is the same as that of the antenna elements 62a and 62b, two adders 68a and 68b whose number is also identical with that of the antenna elements, and six (="the number of users"×"the number of antenna elements") adders 70a-1 and 70a-2, 70b-1 and 70b-2, and 70c-1 and 70c-2.

As mentioned above, the interference canceler 60-2 is configured in the same manner as the canceler 60-1, and therefore the counterparts of the canceler 60-2 are depicted by like numerals with a prime. That is, the interference canceler 60-2 of the second stage is comprised of three IEUs (interference estimation unit) 64a' to 64c' which respectively correspond to the first to third users, two delay units 66a' and 66b' the number of which is identical with that of the antennas, two adders 68a' and 68b' the number of which are also identical with that of the antenna, and six (="the number of users"×"the number of antennas") adders respectively depicted by 70a'-1 and 70a'-2, 70b'-1 and 70b'-2, and 70c'-1 and 70c'-2.

Since the IEUs 64a to 64c are identical with each other in terms of configuration as well as operation, the IEU 64a will mainly be described for the sake of simplifying the disclosure. The IEU 64a is supplied with the signals received at the antenna elements 62a and 62b, and generates two spread "interference estimating signals" which respectively correspond to the antenna elements 62a and 62b. As shown, the outputs of the IEU64a are applied to adders 68a and 68b, and adders 70a'-1 and 70b'-2. Each of delay units 66a and 66b is to delay the signal applied thereto until each of the IEUs 64a to 64c produces the output thereof. The output of the delay 66a is applied to the adder 68a and a delay unit 68a' of the next stage 60-2, and similarly, the output of the delay 66b is fed to the adder 68b and a delay unit 68b' of the next stage 60-2.

By the way, if the first interference canceler 60-1 is able to completely or sufficiently remove interference of one user against the other, there is no need for providing the following canceler 60-2. However, such interference can not be rejected using a signal canceler and thus, it may be typical to provide one or tow canceling stages prior to the final stage.

The adder 68a subtracts the outputs of IEUs 64a to 64c, which correspond to the antenna element 62a, from the output of the delay unit 66a. The adder 70a-1 adds the subtraction result outputted from the adder 68a and one of the outputs of the IEU 64a, which corresponds to the antenna element 62a. As mentioned later, each of the two outputs of the IEU 64a is a spread signal. In a similar manner, the adder 68a subtracts the outputs of IEUs 64a to 64c, which correspond to the antenna element 62b, from the output of the delay unit 66b. The adder 70a-2 adds the subtraction result outputted from the adder 68b and the other output of the IEU 64a, which corresponds to the antenna element 62b.

It is understood that the IEU 64a', included in the second interference canceler 60-2, is supplied with a signal which includes the interfering components relating to only the first user (although ideal).

Antenna weighting coefficient determiners 72a and 72b are supplied with the incoming signals received at the antenna elements 62a and 62b, and respectively generate outputs W1 and W2 which are applied to circuits P1 to P3 of each of the IEUs 64a–64c, 64a'–64c', and 74a–74c.

The IEU 64a of the interference canceler 60-1 will be described in detail with reference to FIGS. 5 and 6. The IEU 64a comprises three circuits P1 to P3 which are respectively provided for three transmission paths. In other words, the IEU 64a is configured so as tom comply with the case in which the number of multiple transmission paths is three. Since the circuits P1 to P3 are substantially identical to each other, only the circuit P1 is described below. As shown in FIG. 6, IEU 64a is generally comprised of a first section S1, a second section S2, and a final section S3. The section S1 comprises two spread-spectrum despreaders (denoted by "despreading" in the drawing) 80a and 80b, whose number equals that of the antenna elements 62a and 62b. The section S1 further comprises multipliers 82a and 82b, an adder 84, and a detector 86. The first section S1 is coupled to the final section S3 by way of an adder 88 and a discriminator 90 (viz., section S2) each of which is common to all the circuits P1 to P3.

As shown in FIG. 6, a first circuit P1 of the final section S3 comprises a multiplier 92, multipliers 94a and 94b whose number equals that of the antenna elements, spread-spectrum spreaders 96a and 96b, adders 98a and 98b, and multipliers 100a and 100b. Each of the adders 98a and 98b is provided so as to add the outputs generated from the circuit P1 to P3 of the section S3. Subsequently, the outputs of the adders 98a and 98b are respectively multiplied, at the multiplier 100, by a weighting coefficient α having a value less than unit, and then applied to the following section.

The detector 86 of the first section S1 comprises a channel estimator 86a, a complex conjugate generator 86b, and multiplier 86c. The spread-spectrum despreaders 80a and 80b operate such as to despread the incoming signals using a despreading (viz., spreading) code previously assigned to the first user, in which the despreading code is correctly phased (synchronized) with the spreading code transmitted via the first propagation path. The multipliers 82a and 82b respectively multiply the outputs of the despreaders 80a and 80b by antenna weighting coefficients W1 and W2, and apply the multiplication results to the adder 84. As mentioned above, the coefficients W1 and W2 are generated from the antenna weighting coefficient determiners 72a and 72b (FIG. 5).

Figure 1:
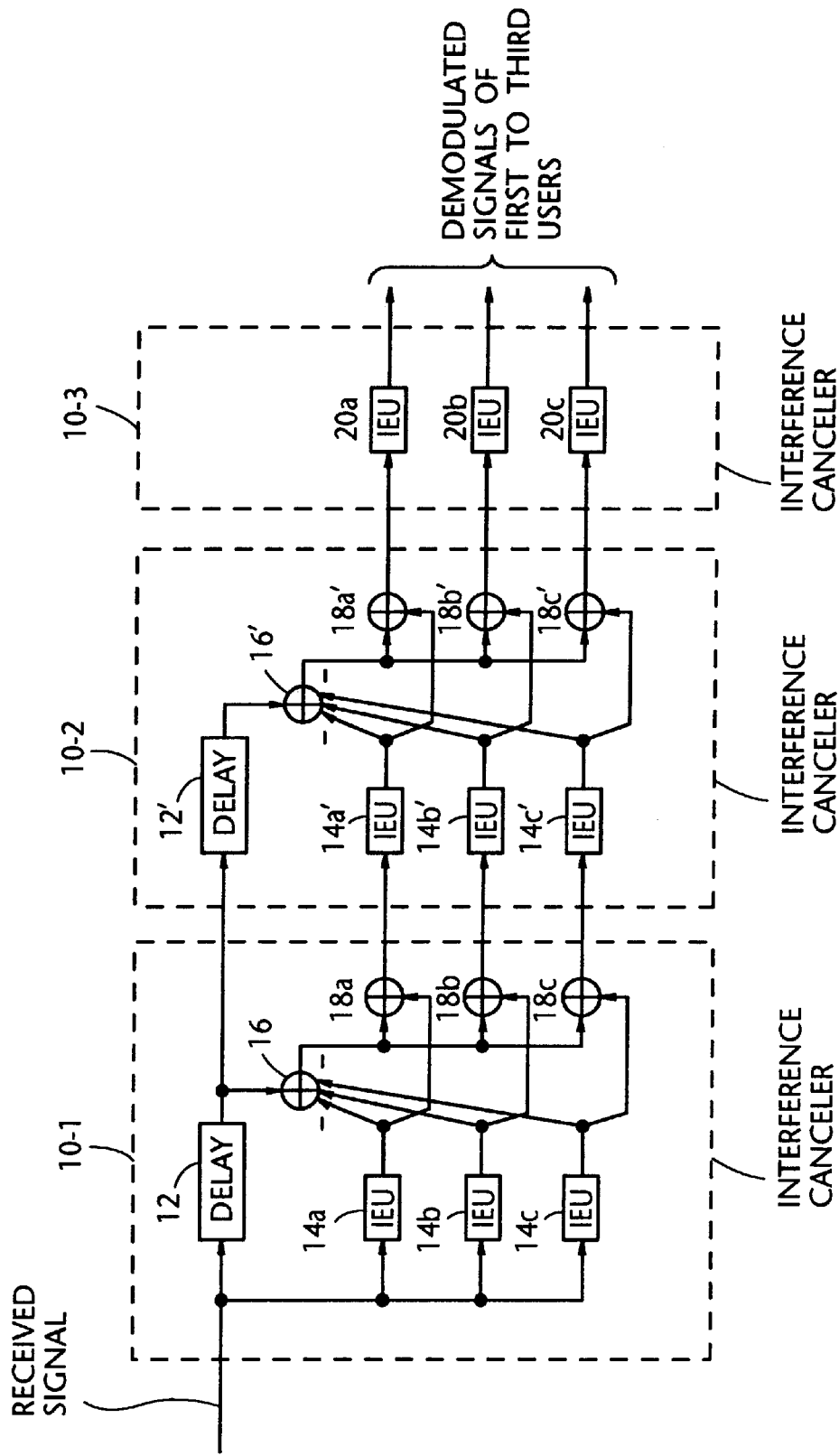
FIG. 1 is a diagram schematically showing a conventional CDMA receiver in block diagram, having referred to in the preceding paragraphs.
Figure 2:
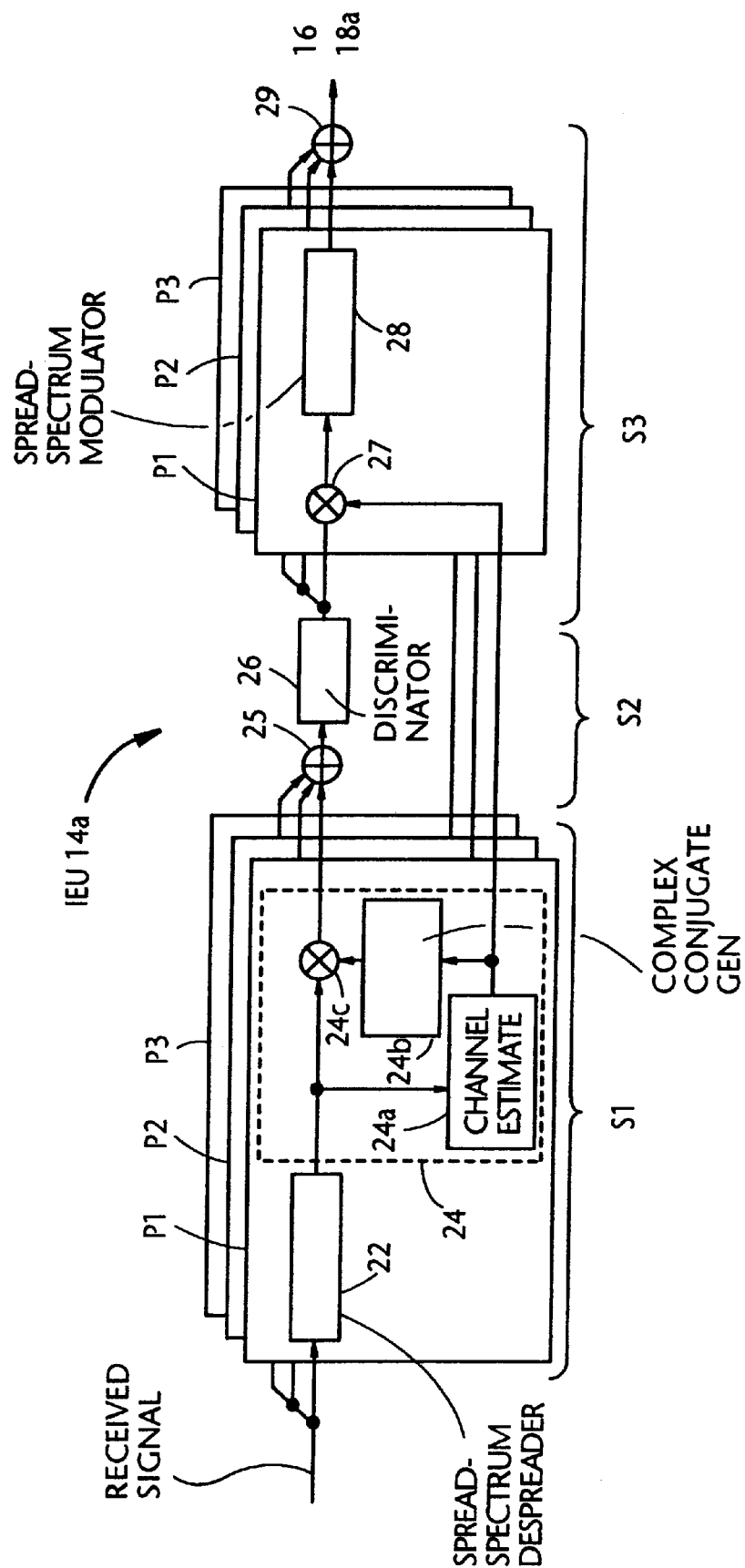
FIG. 2 is a diagram sowing in detail an interference estimation unit (EIU) of FIG. 1.
Figure 3:
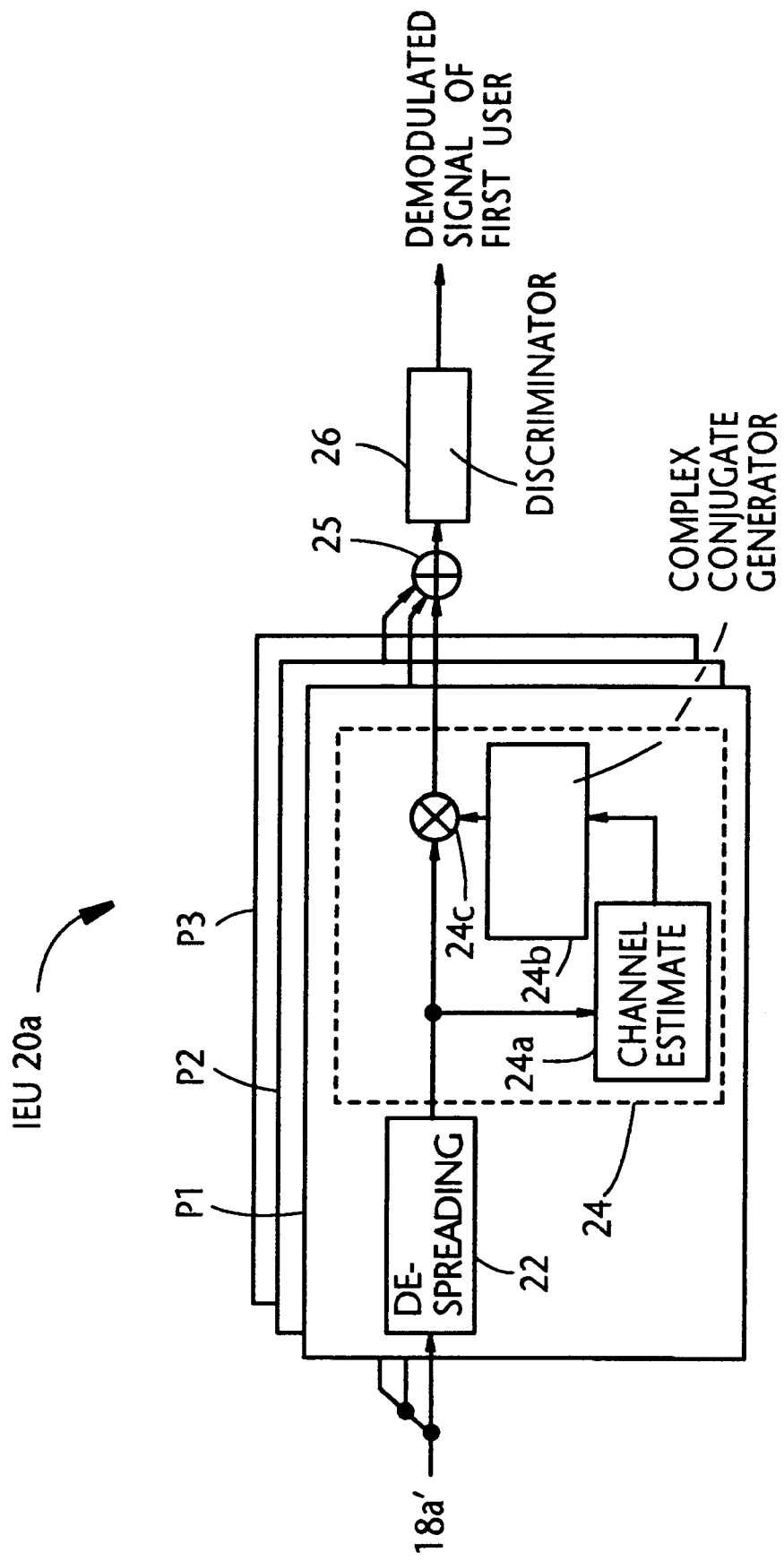
FIG. 3 is a diagram sowing in detail another IEU of FIG. 1.
Figure 4:
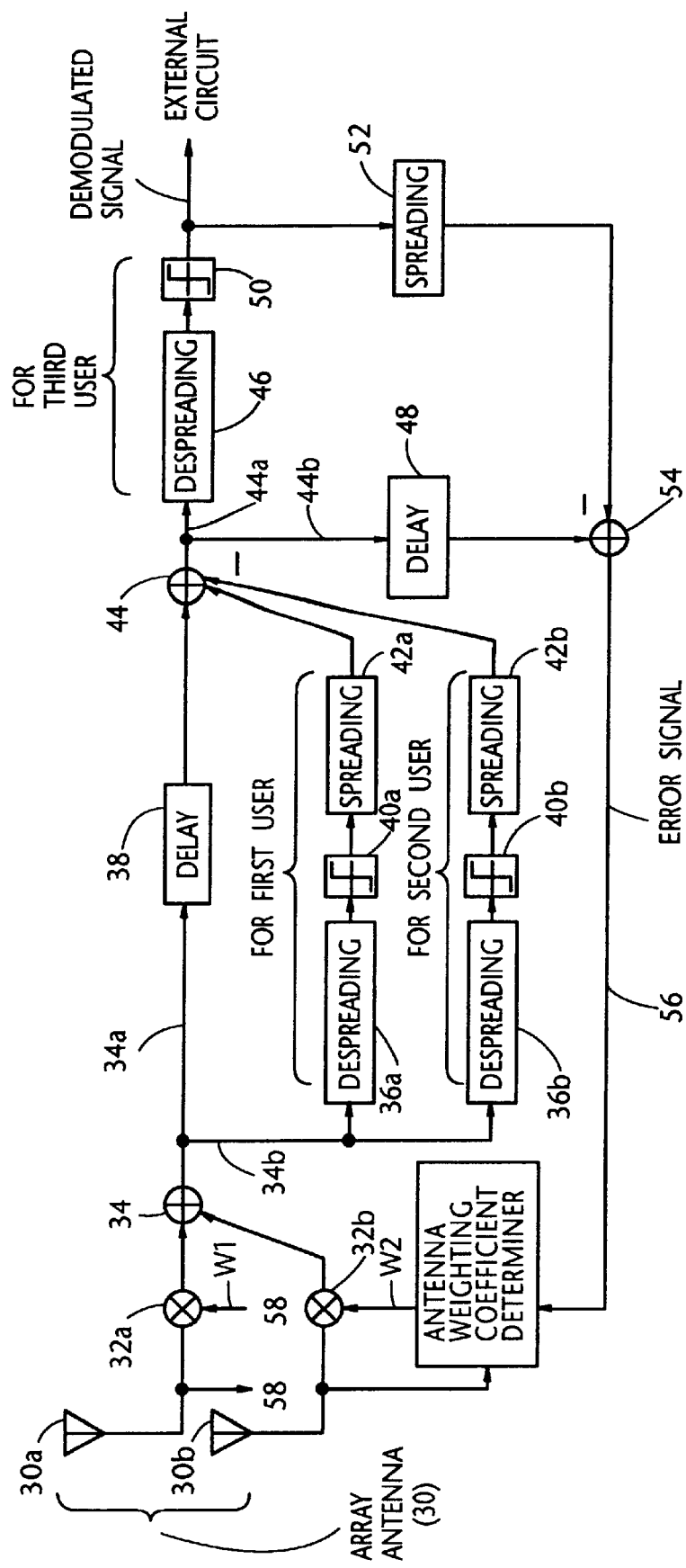
FIG. 4 is a diagram schematically showing another conventional CDMA receiver in block diagram, having referred to in the preceding paragraphs.

The detector 86 operates in exactly the same manner as the conventional detector 24 of FIG. 2. As mentioned above, the multiplier 86c weights the output of the adder 84 using the output of the complex conjugate generator 86b in order to prepare for Rake combination (viz., maximum ratio combination) at the adder 88. That is, the adder 88 receives the outputs from the circuits P1 to P3 which are assigned to three different transmission paths, and carries out Rake combination. The signal combined at the adder 88 is fed to the discriminator 90 at which most likely transmitted symbols are determined.

The multiplier 92 of the section 83 multiplies the output of the discriminator 90 by the output of the channel estimator 86a in order to estimate an interference replica. This operation is implemented at each of the circuits P1 to P3. The estimated interference replica (viz., output of the multiplier 92) is then split into two (viz., the number of antenna elements employed) which are applied to the multipliers 94a and 94b. As shown, the multipliers 94a and 94b multiply the outputs of the multiplier 92 by complex conjugates W1* and W2* which are respectively generated by complex conjugate generators 77a and 77b using the aforesaid antenna weighting coefficients W1 and W2. The outputs of the multipliers 94a and 94b are respectively applied to spread-spectrum modulators 96a and 96b and are spread thereat in a manner to be correctly phased (synchronized) with the spreading code transmitted via the first propagation path. More specifically, the modulators 96a and 96b spread respectively the estimated interfering replicas in connection with the antenna elements 62a and 62b.

Adders 98a and 98b respectively add the spread signals issued from the modulators 96a and 96b in each of the circuits P1 to P3. Thus, the adders 98a and 98b output, respectively, the spread signals indicative of the estimated interference replicas regarding the antenna elements 62 and 62b. The following multipliers 100a and 100b multiply respectively the outputs of the adders 98a and 98b by a weighting coefficient α with a value less than unity, and apply the multiplication results to the following section. The coefficient α is able to suppress "emphasized interference" due to a channel estimation error(s) thereby to improve the interference cancellation characteristics, which is disclosed in detail in the aforesaid Prior Paper 4.

If the antenna weighting coefficient utilizes a complex conjugate vector relating to a steering vector which is determined depending on signal's arrival angles and which indicates phase difference between antenna elements, the signal obtained by antenna weight composition (viz., antenna weighting coefficients) is an in-phase composed signal. In this case, it is possible to correctly reproduce the interference of each antenna element using the steering vector and the signal weighted by antenna coefficients. Further, if the interference cancellation is implemented with each antenna before the antenna weighting is carried out with each user, it is possible to effectively combine the antenna directivity control and a plurality of interference cancelers.

Antenna weighting coefficients are able to be generated using conventional techniques. For further details thereof, reference should be made, for example, to a paper by R. O. Schmidt, et al., entitled "Multiple Emitter Location and Signal Parameter Estimation", IEEE Trans., Vol. AP-34, No. 3, pp. 276–280, March 1986, or a paper by R. Roy and T. Kailath, entitled "ESPRIT—Estimation of signal Parameters via Rotational Invariance Techniques", IEEE Trans., Vol. ASSP-37, pp. 984–995, July 1989.

As shown in FIG. 5, the antenna weighting coefficient determiner 72a outputs nine independent coefficients that are applied to three IEUs of each of the interference canceling stages 60-1 to 60-3. However, if the antenna weighting coefficients are successively renewed, the coefficients are generated, only for the first stage 60-1, using an error between the demodulated result and the known symbol. In this case, it is possible that the stages following the first stage is able to utilize the same antenna weighting coefficients as those used in the first stage.

FIG. 7 is a block diagram showing the details of the IEU 64a' that is configured in the same manner as that of the IEU 64a of FIG. 6, and thus, the further descriptions of FIG. 7 will be omitted for the sake of simplifying the disclosure.

FIG. 8 is a block diagram showing the details of the IEU 74a. As shown, the IEU 74a comprises two sections that are respectively identical with the sections S1 and S2 of FIG. 6 or 7, and thus are labeled S1 and S2.

A second embodiment will be described with reference to FIGS. 9, 10, 11 and 12 which respectively correspond to FIGS. 5, 6, 7 and 8 of the first embodiment. In connection with the second embodiment, it is assumed as in the first embodiment, that the number of multiple transmission paths is three, the number of stages for interference cancellation is three, and the number of simultaneously accessing users is three. It is to be noted that the aforesaid numbers of antenna elements, multiple transmission paths, etc. are exemplary and in no way limited thereto.

Figure 9:
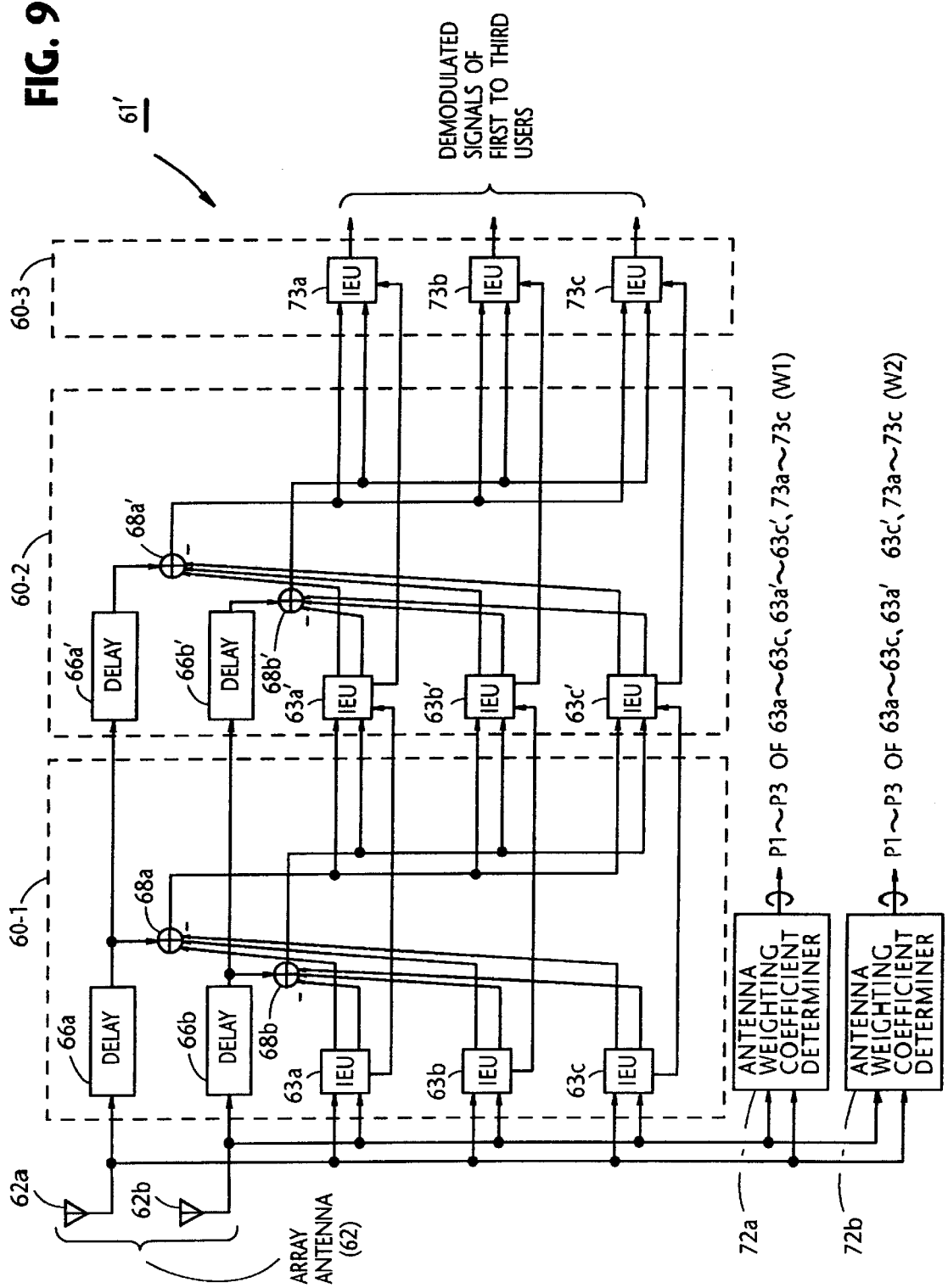
FIG. 9 is a diagram schematically showing a CDMA receiver according to a second embodiment of the present invention.

The second embodiment differs from the first embodiment, in terms of arrangement, as listed below:

(1) IEUs provided in the first stage 60-1 of FIG. 9 are differently configured compared with the counterparts of the first stage of FIG. 5 and therefore are denoted by 63a, 63b, and 63c in FIG. 9;

(2) IEUs provided in the second stage 60-2 of FIG. 9 are differently configured compared with the counterparts of the second stage of FIG. 5 and therefore are denoted by 63a', 63b', and 63c' in FIG. 9;

(3) IEUs provided in the third stage 60-3 of FIG. 9 are differently configured compared with the counterparts of the third stage of FIG. 5 and therefore are denoted by 73a, 73b, and 73c in FIG. 9;

(4) the first stage 60-1 of FIG. 9 lacks the adders 70a-1, 70a-2, ..., 70c-1 that are provided in the first stage of FIG. 5; and (5) the second stage 60-2 of FIG. 9 lacks the adders 70a'-1, 70a'-2, ... 70c'-1 that are provided in the second stage of FIG. 5.

Figure 10:
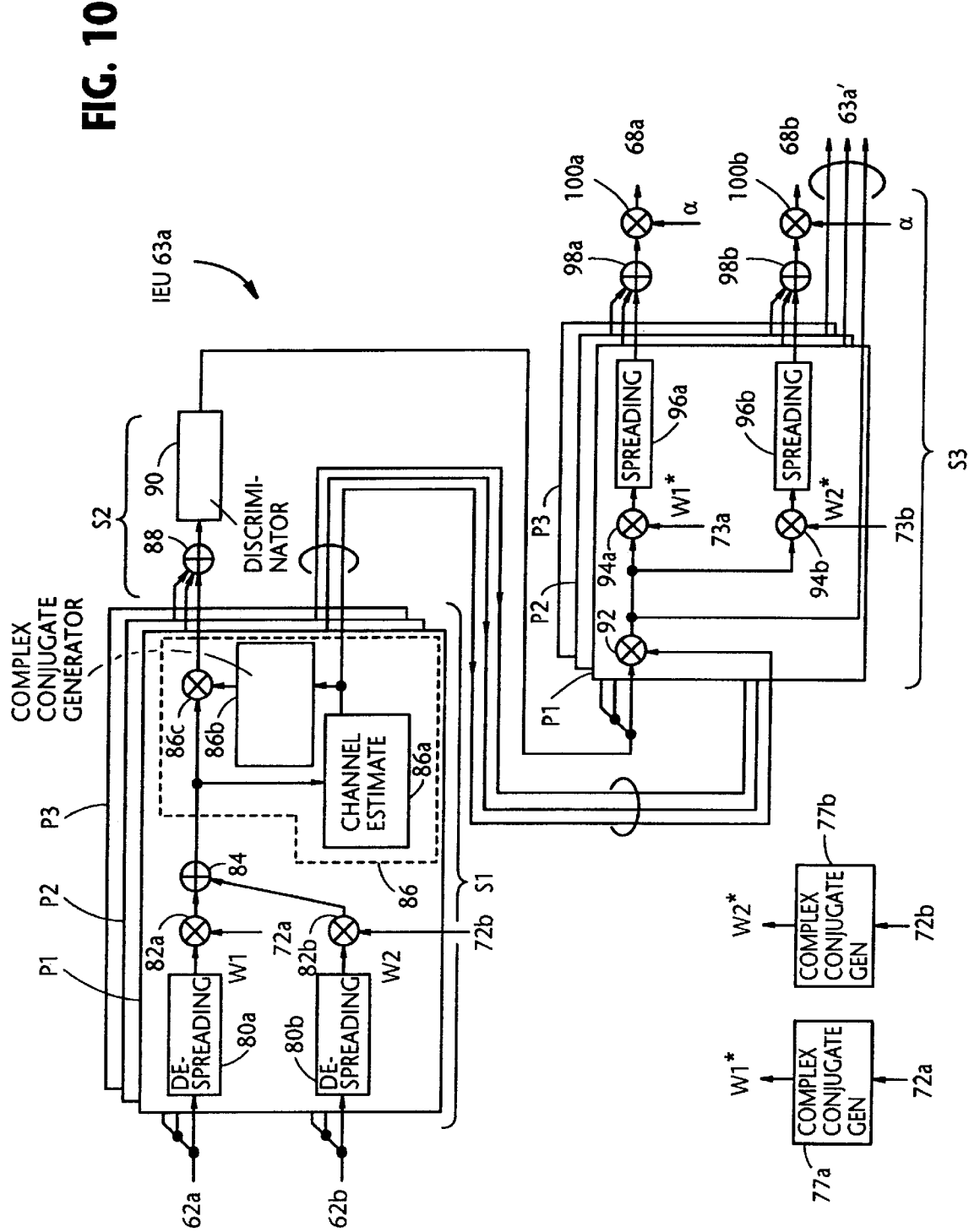
FIGS. 10 to 12 are each diagrams showing a detailed arrangement of a block of FIG. 9.

FIG. 10 shows the details of the IEU 63a (FIG. 9) in which the output of the multiplier 92 of each of the circuits P1 to P3 is directly applied to the IEU 63a' of the next stage 60-2. Other than this, the IEU 63a is configured in a manner that is identical with the corresponding IEU 64a of the first embodiment. Since the output of the multiplier 92 of the circuit P1 is the estimated signal of the first user itself, it is understood that the first interference canceler 60-1 of the second embodiment requires no longer the adders 70a-1, 70a-2, ..., 70c-1, and 70c-2 of the IEU 64a of the first embodiment.

In order to comply with the above-mentioned modification of the IEU 63a, the IEU 63a' of the second interference canceler 60-2 has the first section S1 which includes an adder 85 in addition to the functional blocks already discussed with the first embodiment. The adder 85 is to add the estimated signal of the first user (in the illustrated case of FIG. 11) to the output of the adder 84. The section S3 of the IEU 63a' is identical with the second 3 of the IEU 63a and hence, the description thereof will be omitted for the sake of simplifying the disclosure.

Figure 11:
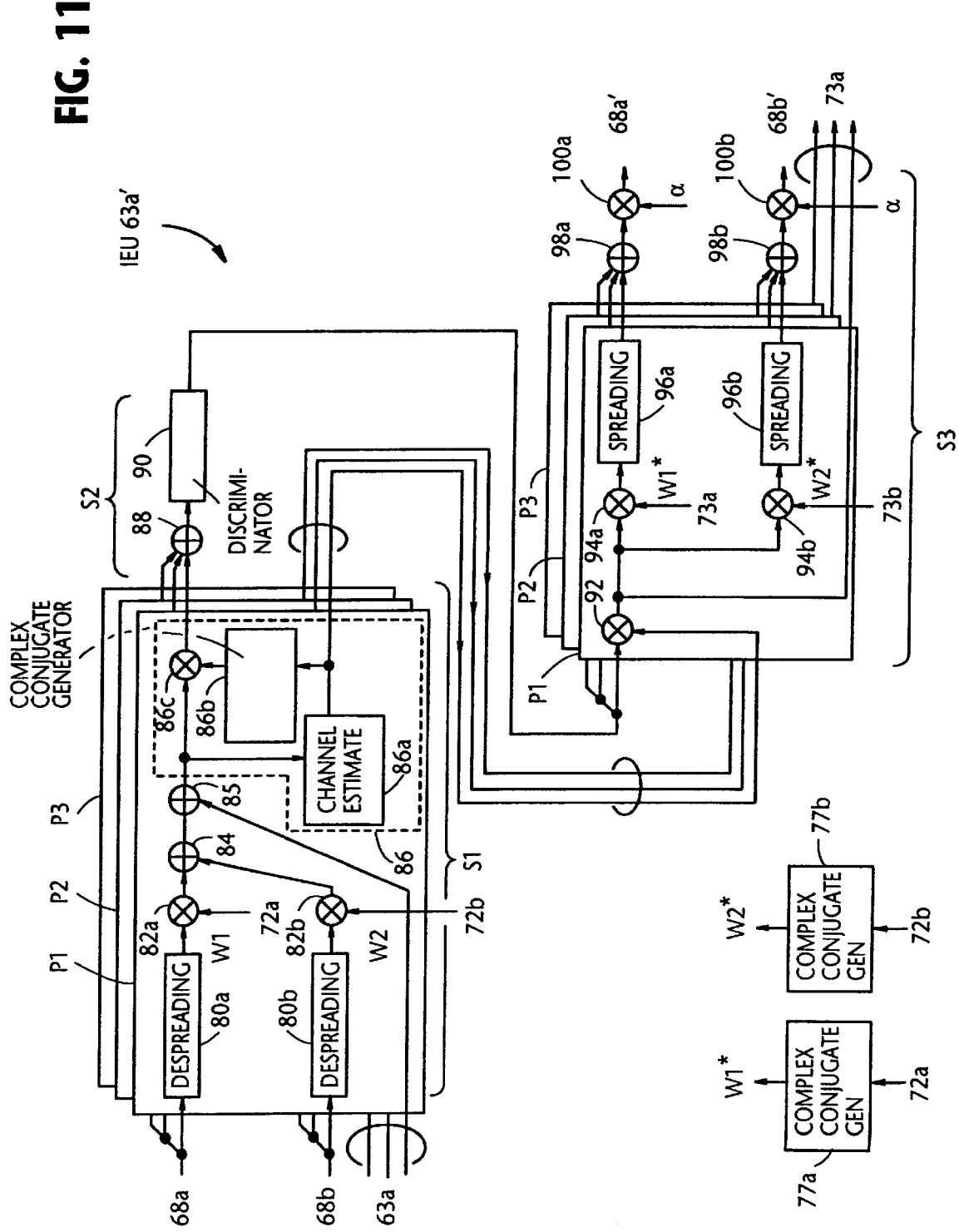
Figure 12:
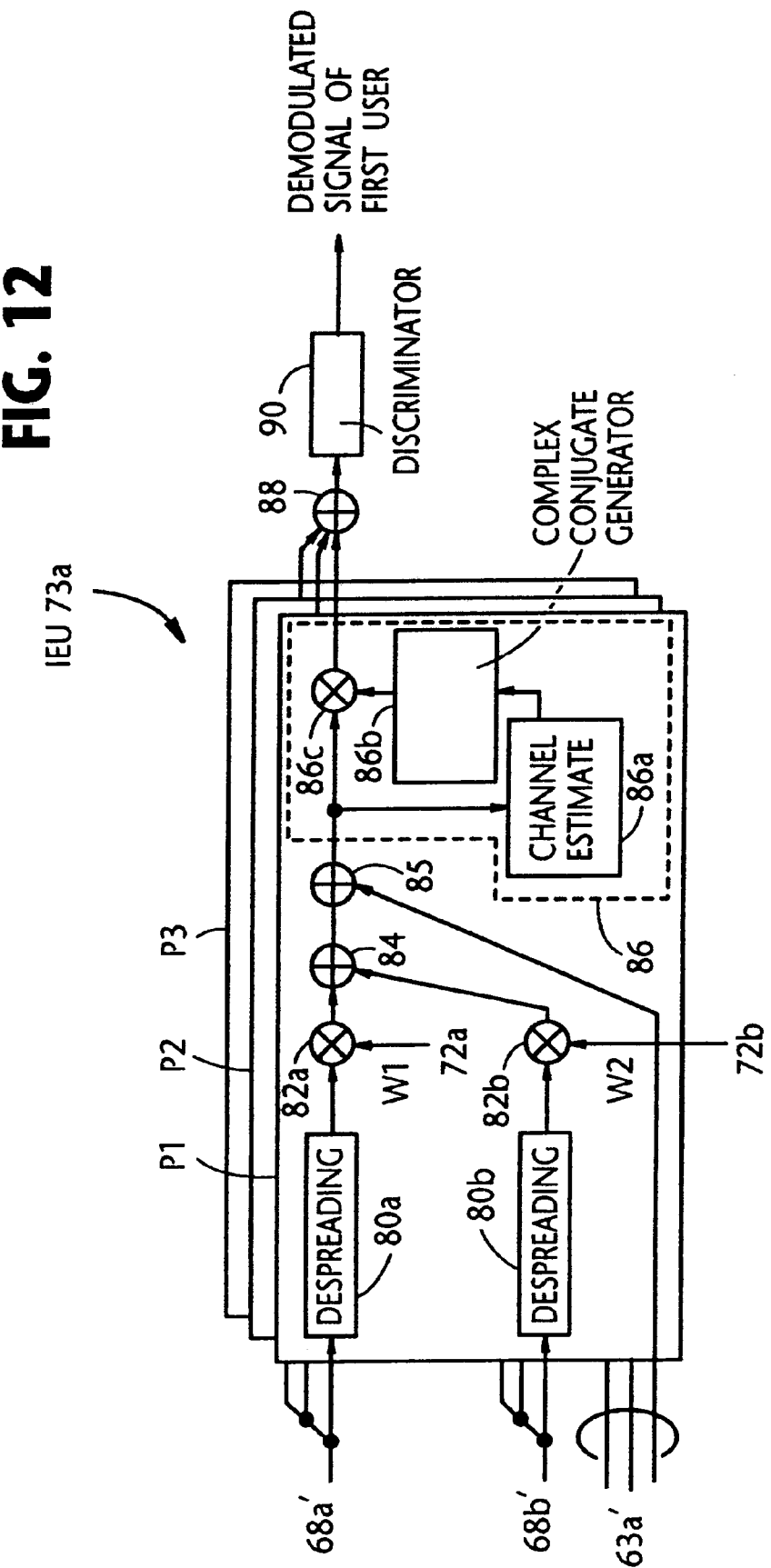

FIG. 12 is a block diagram showing the details of the IEU 73a of FIG. 9. The IEU 73a is identical, in terms of configuration, with a combination of the first and second sections S1 and S2 of FIG. 10 or 11 and accordingly, further description thereof will not been given for brevity.

A third embodiment of the present invention will be described with reference to FIG. 13, 14 and 15 that correspond respectively to FIGS. 9, 10 and 11 of the second embodiment. In connection with the third embodiment, it is assumed, as in each of the preceding embodiments, that the number of multiple transmission paths is three, the number of stages for interference cancellation is three, and the number of simultaneously accessing users is three. It is to be noted that the aforesaid numbers of antenna elements, multiple transmission paths, etc. are exemplary and in no way limited thereto.

Figure 13:
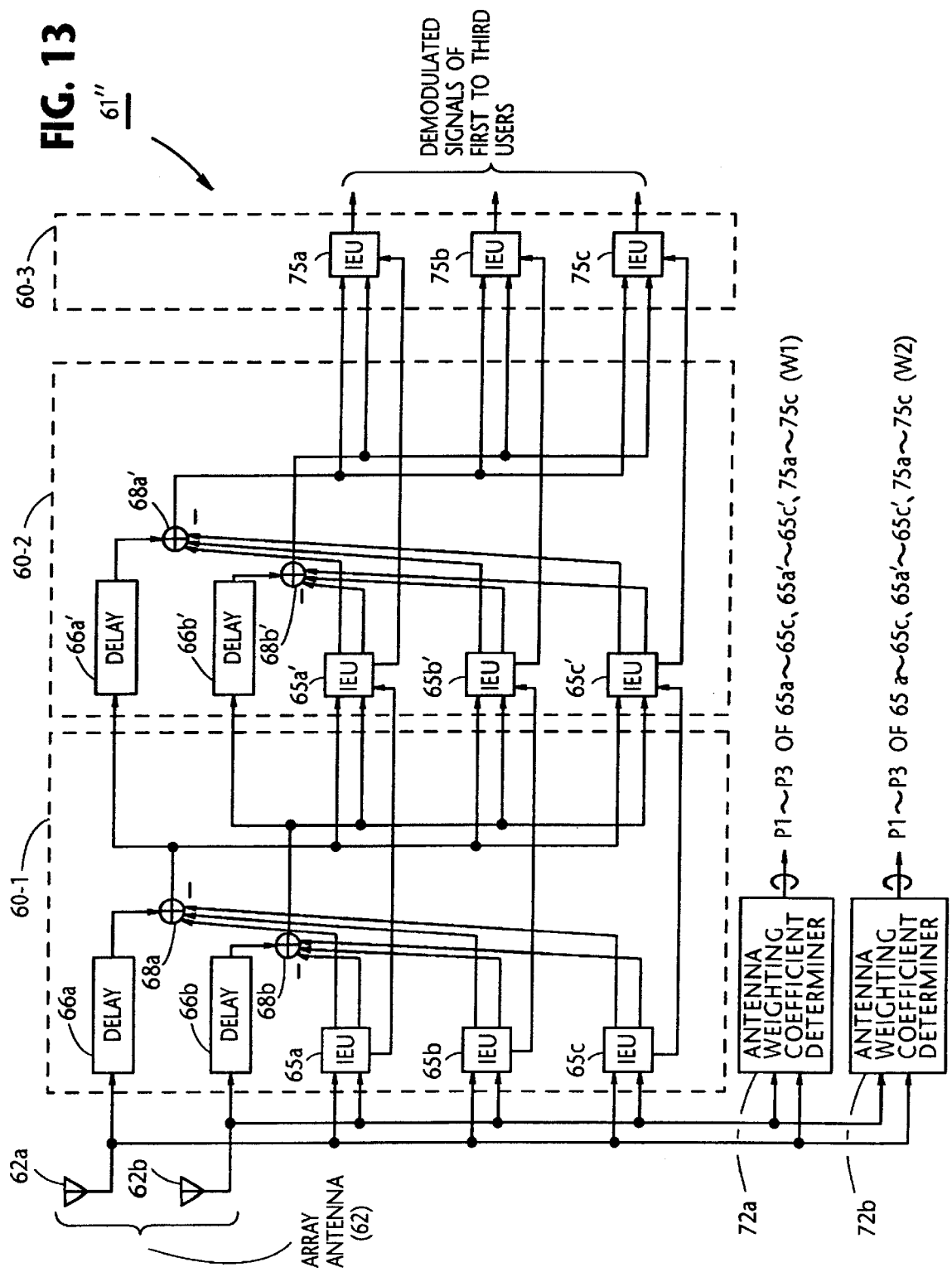
FIG. 13 is a diagram schematically showing a CDMA receiver according to a third embodiment of the present invention.

FIG. 13 shows that the outputs of delay units 66a and 66b are not directly applied to the delay units 66a' and 66b', instead of which the outputs of the adders 68a and 68b are respectively applied to the delay units 66a' and 66b'. That is, the first interference canceler 60-1 applies the error signals, produced form the adders 68a and 68b, to the delay units 66a' and 66b', and IEUs 65a', 65b', and 65c'. In order to meet this modification, each of IEUs 65a' to 65c' of the second stage 60-2 is slightly changed in the configuration thereof as shown in FIG. 15. On the other hand, the IEUs (denoted by 65a to 65c) of the first stage 60-1 are configured in exactly the same as the counterparts 63a to 63c. However, the IEU 65a is shown in FIG. 14 for the convenience of describing the disclosure. IEUs 75a to 75c of the third stage 60-3 are identical with each other and respectively identical with the IEUs 73a to 73c, and accordingly the drawing of the IEU 75a (for example) is not presented for simplifying the disclosure.

Figure 14:
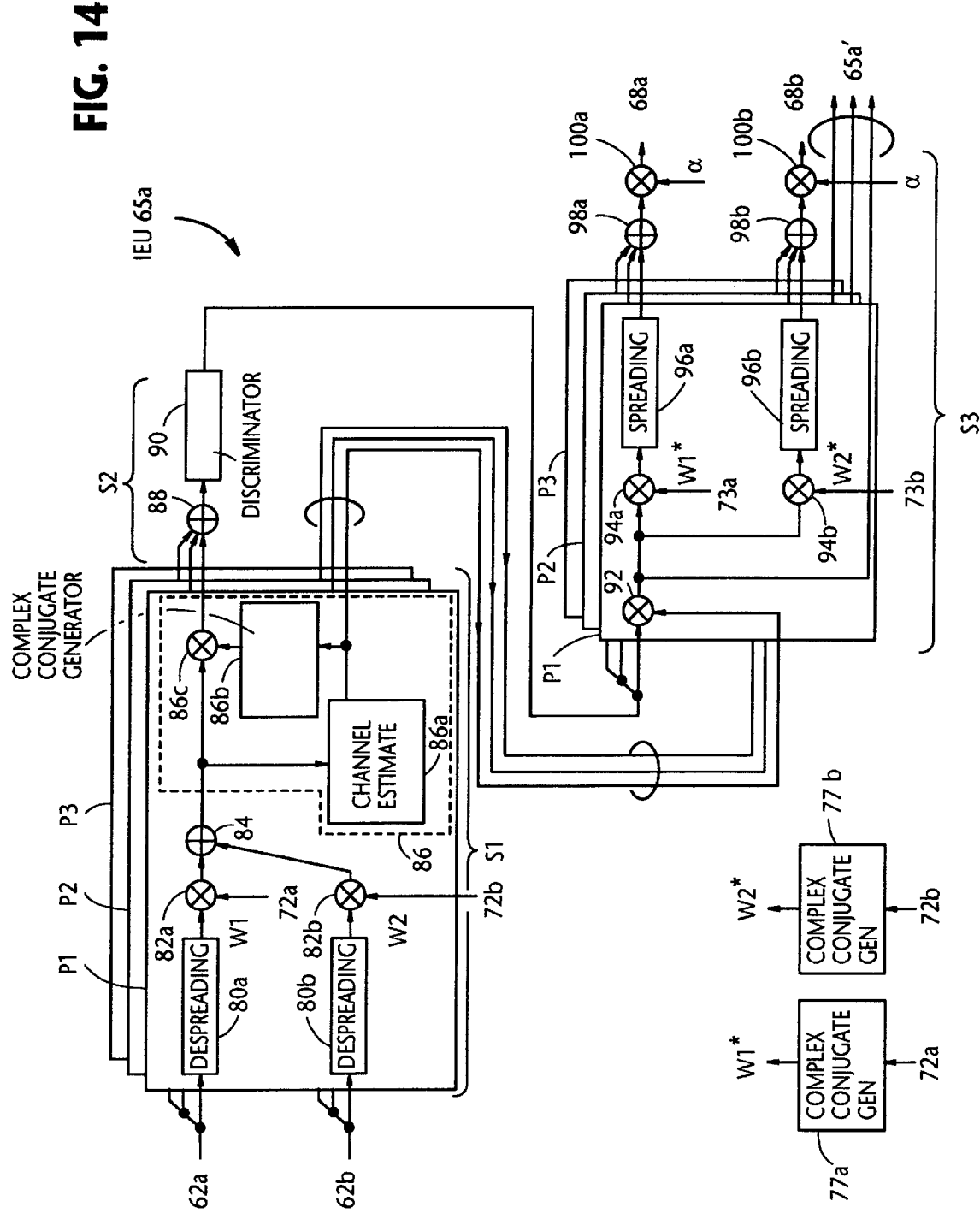
FIGS. 14 and 15 are each diagrams showing a detailed arrangement of a block of FIG. 13.
Figure 15:
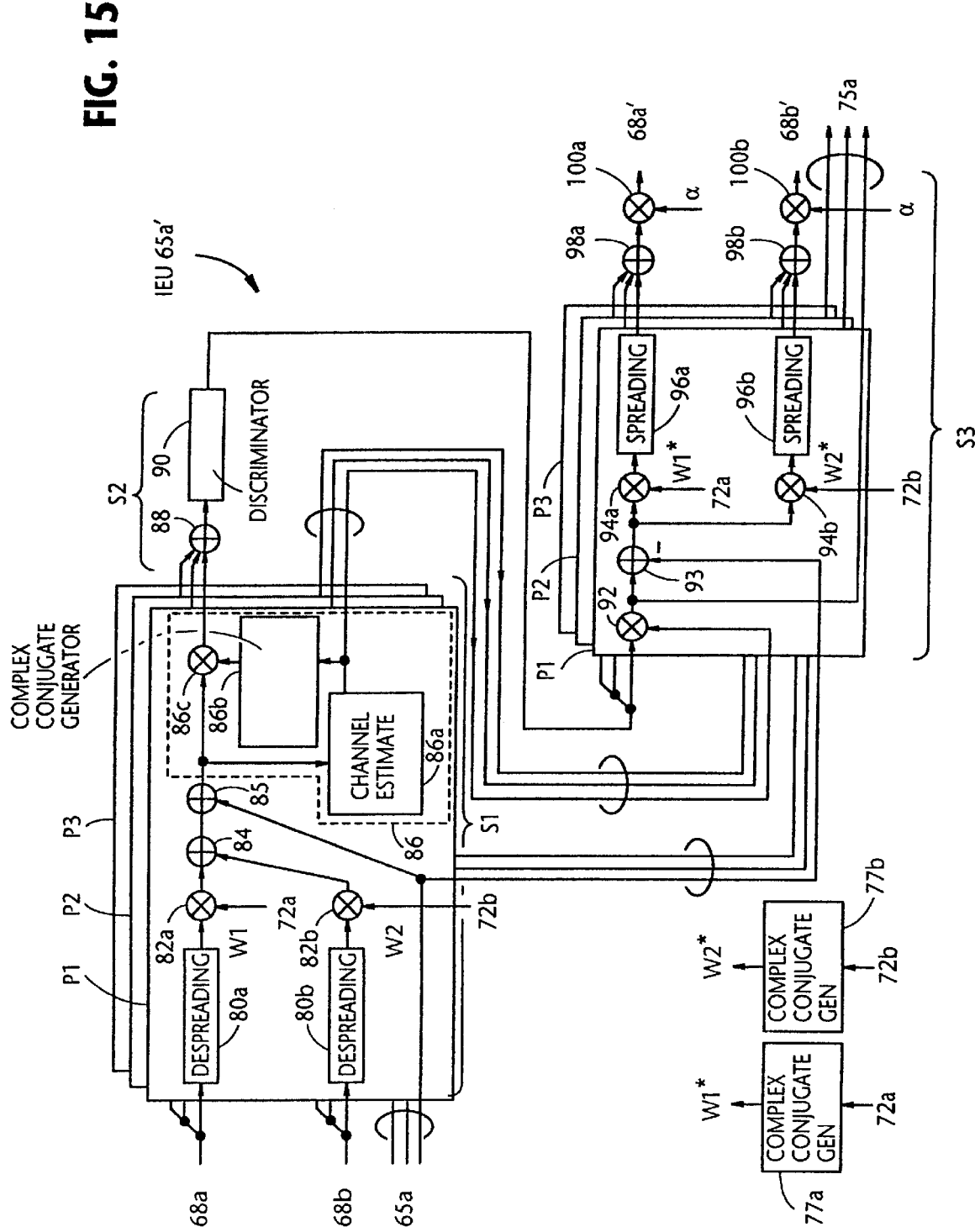

As shown in FIGS. 13, 14 and 15, the third section S3 of the IEU 65a' is provided with an adder 93 to which the outputs of the multipliers 92 of the IEU 65a (FIG. 14) are directly applied. As mentioned above, according to the third embodiment, the error signals from the adders 68a and 68b are directly applied to the second interference canceler 60-2. This implies that the third embodiment is able to reduce a memory capacity compared with the second embodiment.

It will be understood that the above disclosure is representative of only three possible embodiments of the present invention and that the concept on which the invention is based is not specifically limited thereto.

What is claimed is:

1. A CDMA (code division multiple access) multiuser receiver comprising:

an array antenna including a plurality of antenna elements;

a plurality of antenna weighting coefficient determiners, respectively coupled to said plurality of antenna elements, for producing a plurality of antenna weighting coefficients for use in estimating and canceling the interfering signals;

a multiuser receiver coupled to said array antenna, said multiuser receiver including signal processing means which is supplied with signals from said array antenna, said signal processing means estimating and canceling interfering signals with respect to each of said plurality of antenna elements and with respect to each of simultaneously accessing users;

wherein said signal processing means comprises at least two interference cancelers arranged in tandem, one of said two interference cancelers comprising:

a plurality of IEUs (interference estimation units) which are respectively dedicated to the users, each of said plurality of IEUs coupled to receive the signals from said plurality of antenna elements and produce, using said antenna weighting coefficients, an interference estimating signal with respect to the dedicated user and with respect to each of said plurality of antenna elements;

a plurality of first adders which are respectively coupled to said plurality of antenna elements, each of said first adders subtracting, from the signal applied thereto from the corresponding antenna element, the interference estimating signals of all the users with respect to the corresponding antenna element; and a plurality of adder groups whose number equals the number of IEUs, each of said adder groups including a plurality of second adders whose number equals the number of the antenna elements and which are respectively coupled to receive the outputs of said first adders, each of said second adders adding the output of the corresponding first adder and the interference estimating signal outputted from the corresponding IEU with respect to the corresponding antenna element.

2. The CDMA multiuser receiver as claimed in claim 1, further comprising a plurality of delays, respectively provided between said plurality of antenna elements and said plurality of first adders, for delaying the signals from the respective antenna elements so as to respectively compensate for delay induced at said plurality of IEUs.

3. A CDMA (code division multiple access) multiuser receiver comprising:

an array antenna including a plurality of antenna elements;

a plurality of antenna weighting coefficient determiners, respectively coupled to said plurality of antenna elements, for producing a plurality of antenna weighting coefficients for use in estimating and canceling the interfering signals;

a multiuser receiver coupled to said array antenna, said multiuser receiver including signal processing means which is supplied with signals from said array antenna, said signal processing means estimating and canceling interfering signals with respect to each of said plurality of antenna elements and with respect to each of simultaneously accessing users;

wherein said signal processing means comprises at least two interference cancelers arranged in tandem, one of said two interference cancelers comprises:

a plurality of IEUs which are respectively dedicated to the users, each of said plurality of IEUs coupled to receive the signals from said plurality of antenna elements and produce, using said antenna weighting coefficients, an interference estimating signal with respect to the dedicated user and with respect to each of said plurality of antenna elements, each of said plurality of IEUs further producing an estimated signal with respect to the dedicated user; and a plurality of adders which are respectively coupled to said plurality of antenna elements, each of said adders subtracting, from the signal applied thereto from the corresponding antenna element, the interference estimating signals off all the users with respect to the corresponding antenna element.

4. The CDMA multiuser receiver as claimed in claim 3, further comprising a plurality of delays, respectively provided between said plurality of antenna elements and said plurality of first adders, for delaying the signals from the respective antenna elements so as to respectively compensate for delay induced at said plurality of IEUs.

* * * * *

UNITED STATES PATENT AND TRADEMARK OFFICE
CERTIFICATE OF CORRECTION

PATENT NO. : 6,222,498 B1
DATED : April 24, 2001
INVENTOR(S) : Naoto Ishii et al.

It is certified that error appears in the above-identified patent and that said Letters Patent is hereby corrected as shown below:

<u>Column 2,</u>
Line 21, "EIUs" should read -- IEUs --

<u>Column 5,</u>
Line 27, "present is" should read -- present invention is --
Line 58, "sowing" should read -- showing --
Line 60, "sowing" should read -- showing --

<u>Column 7,</u>
Line 63, "multiplier" should read -- a multiplier --

<u>Column 8,</u>
Line 20, "83" should read -- 53 --

<u>Column 10,</u>
Line 28, "68aand" should read -- 68a an --

<u>Column 12, claim 3,</u>
Line 31, "off" should read -- of --

Signed and Sealed this

Twenty-second Day of January, 2002

Attest:

*Attesting Officer*

JAMES E. ROGAN
*Director of the United States Patent and Trademark Office*